(12) United States Patent
Kobayashi et al.

(10) Patent No.: US 6,427,243 B2
(45) Date of Patent: Aug. 6, 2002

(54) THERMAL EXPANSION VALVE

(75) Inventors: Kazuto Kobayashi; Asao Kato, both of Tokyo (JP)

(73) Assignee: Fujikoki Corporation, Tokyo (JP)

( * ) Notice: Subject to any disclaimer, the term of this patent is extended or adjusted under 35 U.S.C. 154(b) by 0 days.

(21) Appl. No.: 09/750,117

(22) Filed: Dec. 29, 2000

(30) Foreign Application Priority Data

Jan. 18, 2000 (JP) ........................................ 2000-008956

(51) Int. Cl.[7] .................................................. G05D 3/00
(52) U.S. Cl. ............................................ 2/92 B; 62/225
(58) Field of Search ........................... 62/225; 236/92 B (56) References Cited

U.S. PATENT DOCUMENTS

| | | | | |
|---|---|---|---|---|
| 5,303,864 A | * | 4/1994 | Hirota | 236/92 B |
| 5,924,629 A | * | 7/1999 | Kobayashi et al. | 236/92 B |
| 5,996,899 A | * | 12/1999 | Watanable et al. | 236/92 B |
| 6,062,484 A | * | 5/2000 | Eybergen | 236/92 B |
| 6,293,472 B1 | * | 9/2001 | Yano | 236/92 B |

FOREIGN PATENT DOCUMENTS

| | | |
|---|---|---|
| JP | 06 185833 | 7/1994 |
| JP | 08 226567 | 9/1996 |
| JP | 11 304298 | 11/1999 |

* cited by examiner

*Primary Examiner*—William C. Doerrler
*Assistant Examiner*—Mohammad M Ali
(74) *Attorney, Agent, or Firm*—Rader, Fishman & Grauer, PLLC (57) ABSTRACT

A thermal expansion valve 10-3 includes a passage 32 through which refrigerant enters a prism-shaped body 30 from a receiver, and a valve means 32b placed within a valve chamber 35 for controlling the opening of an orifice 32a. The refrigerant returning from an evaporator 8 travels through a passage 34 toward a compressor 4. A power element 60 that drives the valve means 32b via a heat sensing shaft 36f comprises a disk-shaped housing 36d and a diaphragm 60a placed within said housing, which constitute a pressure working chamber 36b. A working gas is filled inside said pressure working chamber 36b and sealed thereto by a plug body 60k. The diameter size of the diaphragm 60a and the whole size of the plug body 60k are reduced in order to miniaturize and reduce the weight of the thermal expansion valve as a whole.

4 Claims, 7 Drawing Sheets

THERMAL EXPANSION VALVE

FIELD OF THE INVENTION

The present invention relates to a thermal expansion valve used in a refrigeration cycle.

DESCRIPTION OF THE RELATED ART

Heretofore, a thermal expansion valve used in the refrigeration cycle of an air conditioning device on a vehicle and the like comprised of a valve body including a high-pressure refrigerant passage through which liquid-phase refrigerant to be decompressed travels and a low-pressure refrigerant passage through which gas-phase refrigerant travels, and a valve hole formed to the high-pressure refrigerant passage; a valve means that is driven to move toward or away from the valve hole of the valve body for changing the opening of the valve hole; a pressure working housing mounted to the valve body for detecting the temperature of the gas-phase refrigerant, the housing equipped with a diaphragm for driving the valve means and controlling the movement thereof, and a pressure equalizing chamber communicated to the low-pressure refrigerant passage and an airtight chamber separated by the diaphragm and filled with a predetermined refrigerant; and a plug body for sealing the predetermined refrigerant filled into the airtight chamber through a hole formed to the outer wall of the pressure working housing.

Figure 5:
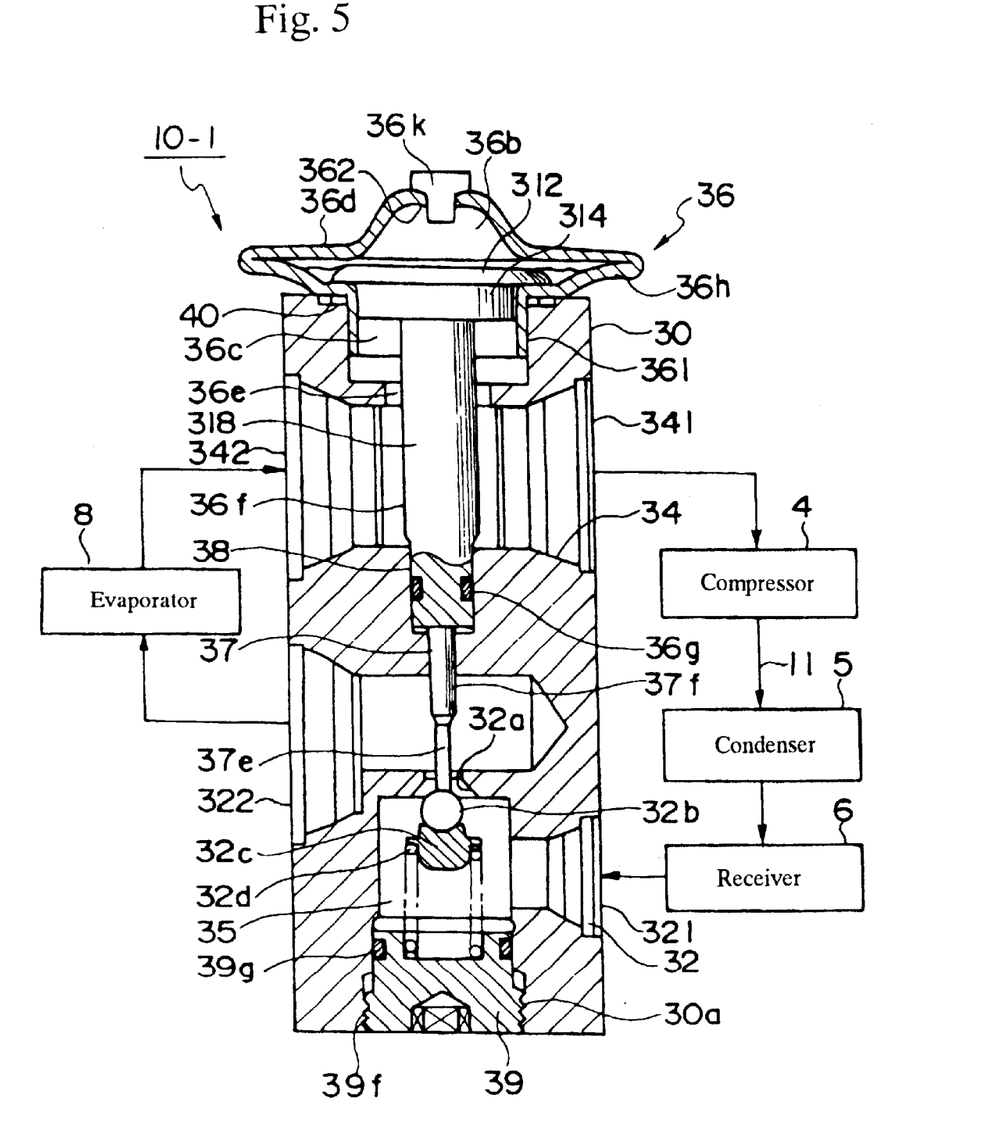
FIG. 5 is a vertical cross-sectional view showing the structure of a conventional thermal expansion valve.
Figure 6:
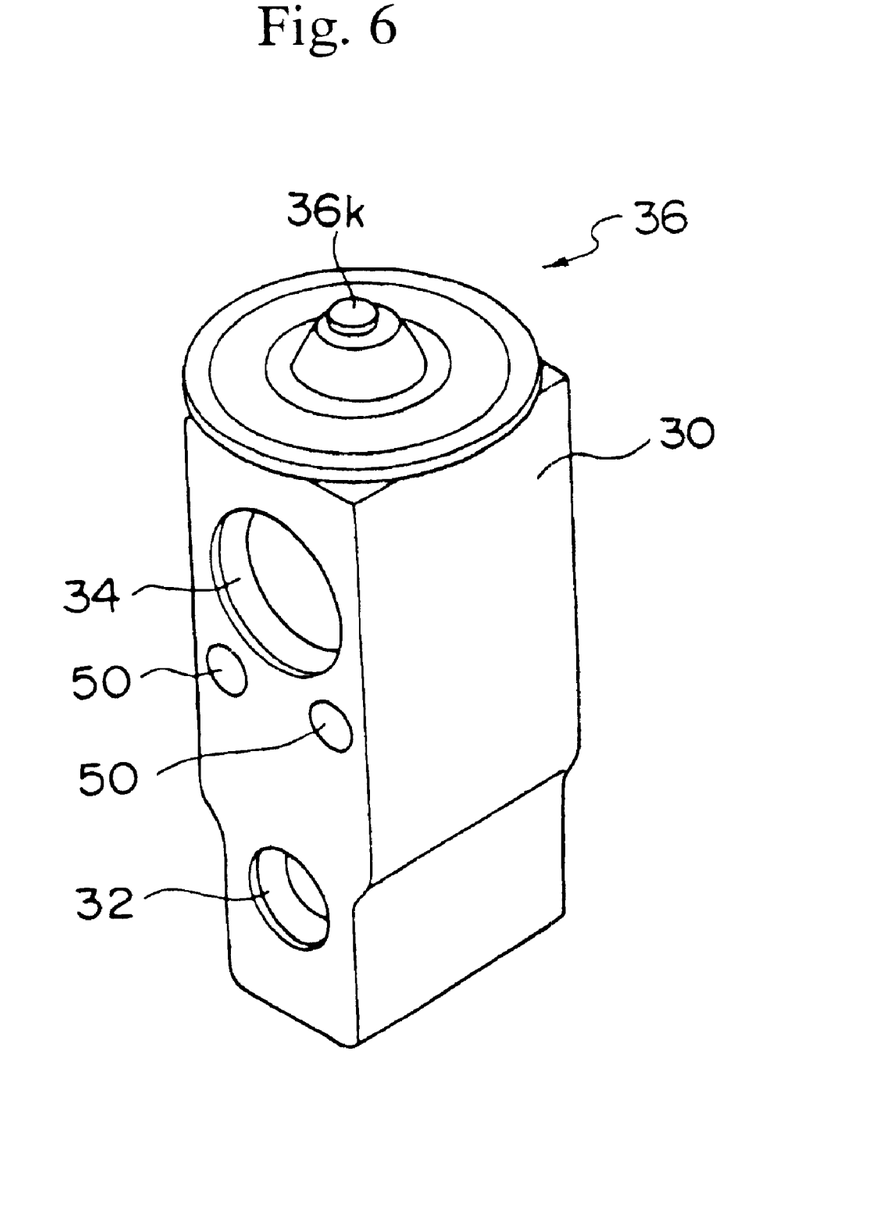
FIG. 6 is a perspective view showing the outline of the thermal expansion valve of FIG. 5.

This type of prior-art thermal expansion valve is shown in the vertical cross-sectional view of FIG. 5, which shows the state where the valve is equipped in a refrigeration cycle of the air conditioning device on a vehicle, the schematic outline view thereof shown in FIG. 6. In FIG. 5, the thermal expansion valve 10-1 comprises a prism-shaped valve body 30 made for example of aluminum, and a first passage 32 through which refrigerant flowing in from a condenser 5 and a receiver 6 toward an evaporator 8 constituting the refrigeration cycle 11 travels, and a second passage 34 through which refrigerant flowing in from the evaporator 8 toward a compressor 4 travels, the first and second passages formed mutually separately with one passage placed above the other in the valve body. Moreover, the first passage 32 of the valve of FIG. 5 is equipped with an orifice 32a, a valve chamber 35, a spherical valve means 32b placed to the upper stream side of the passage 32 for controlling the quantity of refrigerant that passes through the orifice 32a, and an adjustment screw 39 of a spring 32d that presses the valve means 32b toward the orifice 32a through a valve member 32c. The adjustment screw 39 having a screw portion 39f is movably screwed onto a mounting hole 30a communicated to the valve chamber 35 of the first passage 32 through the lower end surface of the valve body 30, with an o-ring mounted to the adjustment screw 39 that secures the airtight state with the valve body 30. The adjustment screw 39 and the pressurizing spring 32d adjust the opening of the valve means 32b against the orifice 32a.

Reference number 321 refers to an entrance port through which the refrigerant sent out from the receiver 6 toward the evaporator 8 enters. A valve chamber 35 is connected to the entrance port 321, and reference number 322 refers to an exit port of the refrigerant flowing toward the evaporator 8. In FIG. 6, reference number 50 refers to bolt holes for mounting the expansion valve to position, and the bottom region of the valve body 30 is formed narrower than the other regions. The valve body 30 is equipped with a small-diameter hole 37 and a large-diameter hole 38 having a larger diameter than the hole 37, which open or close the orifice 32a by providing drive force to the valve means 32 corresponding to the exit temperature of the evaporator 8 of the valve body 30, the holes 37 and 38 being formed in coaxial relations with the orifice 32a. The upper end of the valve body 30 is equipped with a screw hole 36 to which the power element unit 36 including an airtight chamber is fixed.

The power element unit 36 comprises a diaphragm 36a made for example of stainless steel, and an upper pressure working chamber 36b and a lower pressure working chamber 36c welded and sealed to each other with the diaphragm 36a sandwiched in between, forming two airtight chambers above and under the diaphragm. An upper lid 36d made of stainless steel defines the upper pressure working chamber 36b together with the diaphragm 36a, and is equipped with a hole 362 and a plug body 36k for sealing the predetermined refrigerant working as a diaphragm driving fluid in the upper chamber. The plug body 36k is made for example of stainless steel, which is formed either through cutting or forging, and welded onto the hole 362 of the upper lid 36d for securing an airtight chamber. The lower lid 36h is screwed onto the screw hole 361 through a packing 40. The lower pressure working chamber 36c is communicated to the second passage 34 via a pressure equalizing hole 36e formed concentrically to the center line of the orifice 32a. The refrigerant exiting the evaporator 8 flows into the second passage 34, and the passage 34 acts as the gas-phase refrigerant passage. The pressure of the refrigerant flowing through passage 34 is loaded to the lower pressure working chamber 36c via the pressure equalizing hole 36e. Further, 342 is the entrance port through which the refrigerant sent out from the evaporator 8 enters, and 341 is the exit port through which the refrigerant sent toward the compressor exits.

A heat sensing shaft 36f made of aluminum is equipped to the valve body, with a large-diameter dish shaped peak portion 312 formed to contact the center area of the lower surface of the diaphragm 36a within the lower pressure working chamber. The shaft 36f is slidably mounted inside the large-diameter hole 38 and penetrates through the second passage 34, transmitting the refrigerant exit temperature of the evaporator 8 to the lower pressure working chamber 36c, and providing drive force by sliding inside the large-diameter hole 38 corresponding to the displacement of the diaphragm 36a accompanied by the pressure difference of the upper pressure working chamber 36b and the lower pressure working chamber 36c. Moreover, a working shaft 37f made of stainless steel and having a smaller diameter than the heat sensing shaft 36f is slidably mounted inside the small-diameter hole 37 for pressing the valve means 32b corresponding to the displacement of the heat sensing shaft 36f and resisting to the elastic force of the biasing means 32d. The upper end region of the heat sensing shaft 36f comprises a peak portion 312 that acts as the receiving portion of the diaphragm 36a, and a large-diameter portion 314 that slides within the lower pressure working chamber 36c. The lower end region of the heat sensing shaft 36f contacts the upper end region of the working shaft 37f, and the lower end region of the working shaft 37f contacts the valve means 32b. The heat sensing shaft 36f and the working shaft 37f constitute a valve driving shaft 318. Further, the peak portion 312 and the large diameter portion 314 can be formed integrally.

As explained, the valve driving shaft 318 extending from the lower surface of the diaphragm 36a to the orifice 32a of the first passage 32 is concentrically arranged within the pressure equalizing hole 36e. The portion 37e of the working shaft 37f that penetrates the orifice 32a is formed narrower than the inner diameter of the orifice 32a, and the refrigerant travels through the orifice 32a. The heat sensing shaft 36f is equipped with an O-ring 36g that acts as a sealing member securing the seal between the first passage 32 and the second passage 34.

A known diaphragm drive fluid is filled inside the upper pressure working chamber 36b of the pressure working housing 36d. The heat of the refrigerant flowing through the second passage 34 after exiting the evaporator 8 is transmitted to the diaphragm drive fluid via the valve drive shaft 318 exposed to the second passage 34 or the pressure equalizing hole 36e communicated to the second passage 34, and via the diaphragm 36a.

The diaphragm drive fluid filled inside the upper pressure chamber 36b gasifies corresponding to the transmitted heat, and loads pressure onto the upper surface of the diaphragm 36a. The diaphragm 36a is displaced in the vertical direction corresponding to the difference in the pressure of the diaphragm drive gas loaded to the upper surface thereof and the pressure loaded to the lower surface thereof.

The vertical displacement of the center area of the diaphragm 36a is transmitted via the valve drive shaft to the valve means 32b, thereby moving the valve means 32b closer to or away from the valve seat of the orifice 32a. As a result, the flow of the refrigerant is controlled.

The temperature of the low-pressure gas-phase refrigerant at the exit side of the evaporator 8 (being sent out from the evaporator) is transmitted to the upper pressure working chamber 36b, and corresponding to the transmitted temperature, the pressure in the upper pressure working chamber 36b changes, and the exit temperature of the evaporator 8 rises. In other words, when the heat load of the evaporator increases, the pressure of the upper pressure working chamber 86b rises, and correspondingly, the heat sensing shaft 36f or valve drive shaft is driven downward pressing down the valve means 32b, thereby increasing the opening of the orifice 32a. This increases the amount of refrigerant being supplied to the evaporator 8, and reduces the temperature of the evaporator 8. In contrast, the temperature of the refrigerant exiting the evaporator 8 is reduced. In other words, if the heat load of the evaporator is reduced, the valve means 32b is driven to the opposite direction, reducing the opening of the orifice 32a, reducing the amount of refrigerant supplied to the evaporator, and thereby increases the temperature of the evaporator 8.

Figure 7:
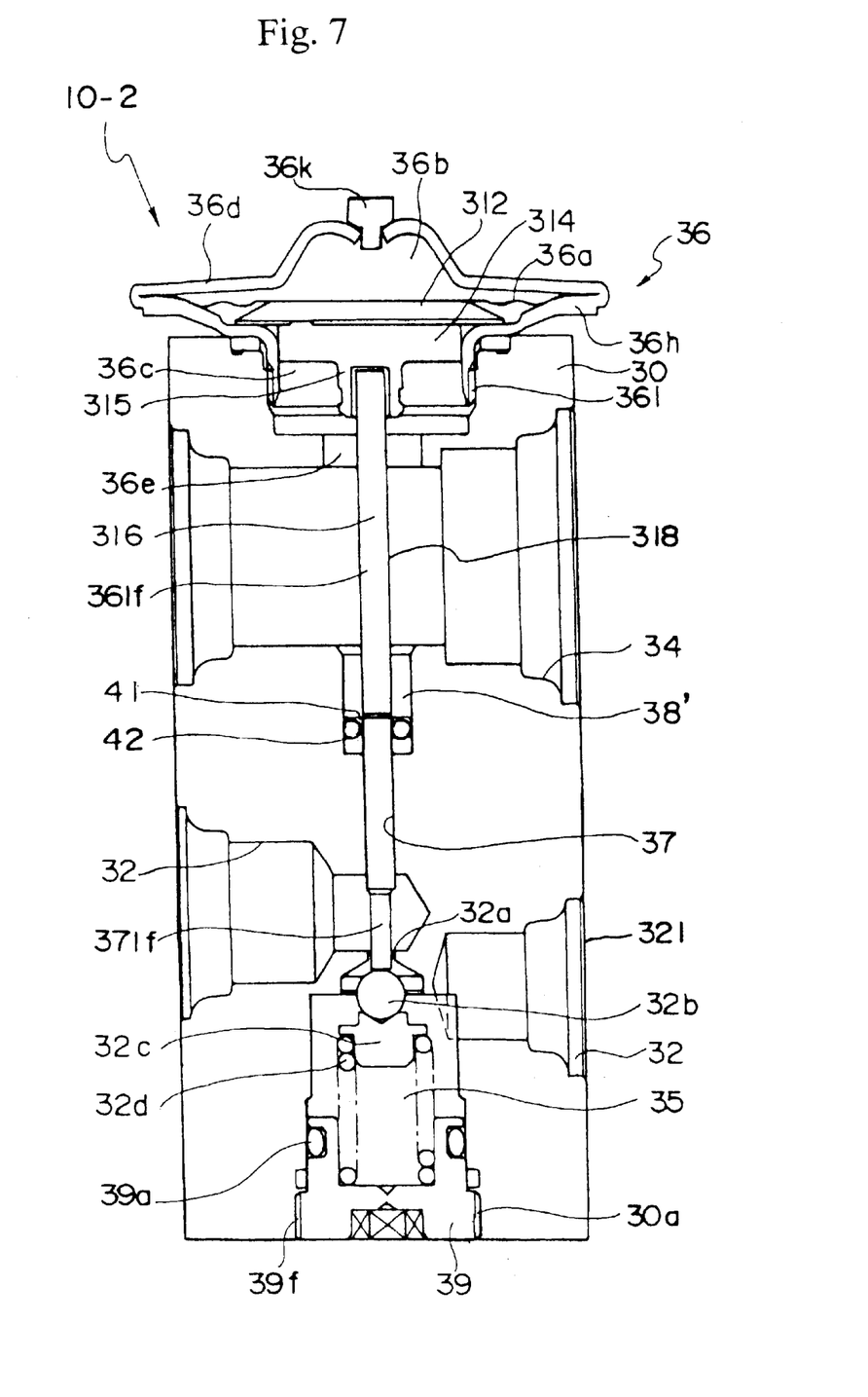
FIG. 7 is a vertical cross-sectional view showing the structure of another conventional thermal expansion valve.

According to the thermal expansion valve shown in FIG. 5, the heat sensing shaft 36f is a member having a relatively large diameter, and this member together with a working shaft constitute the valve drive shaft. However, another prior art example of the thermal expansion valve includes a valve drive shaft formed of a rod member. The thermal expansion valve 10-2 according to the prior art using this rod member is shown in FIG. 7. The movement of the thermal expansion valve shown in FIG. 7 is similar to the thermal expansion valve shown in FIG. 5, and the members provided with the same reference numbers as used in FIGS. 5 and 6 refer to either identical or equivalent parts. Further, the components constituting the refrigeration cycle, such as the compressor, the condenser, the receiver and the evaporator, are not shown in FIG. 7.

The heat sensing portion 318 equipped with a heat sensing structure works as the heat sensing shaft 361f, and a diaphragm 36a contacts the surface thereof. The heat sensing portion 318 includes a large-diameter stopper portion 312 that receives the diaphragm 36a, a large-diameter portion 314 having one end surface attached to the back surface of the stopper portion 312 and the center area of the other end surface formed into a protrusion 315 that is slidably inserted to the lower pressure working chamber 36c, and an integrally-formed continuous rod member 316 having one end surface fit into the protrusion 315 formed to the large-diameter portion 314 and the other end surface attached to a valve means 32b via a portion 371f corresponding to the working shaft. The heat sensing shaft 361f constituting the rod member 316 is exposed to the second passage, and the heat of the refrigerant vapor is transmitted therethrough.

The rod member 316 working as the heat sensing shaft 361f is driven to move back and forth traversing the passage 34 along with the displacement of the diaphragm 36a in the power element unit 36. With this movement, a clearance (gap) communicating the passage 32 and the passage 34 is formed along the rod portion 316. In order to prevent such communication, an O-ring 42 is mounted in a large-diameter hole 38' that contacts the outer circumference of the rod portion 316, and thereby, the O-ring is placed between the two passages. Moreover, a push nut 41 working as a detent nut is fixed to the rod portion 316 inside the large-diameter hole 38' and adjacent to the O-ring 42, preventing the O-ring from moving by the force working in the longitudinal direction (the direction toward the power element portion 36) provided by the refrigerant pressure of the passage 321 and the coil spring 32d.

The plug body 36k of the conventional thermal expansion valve and the welding of the plug body 36k and the hole 362 is disclosed for example in Japanese Patent Laid-Open Publications No. 6-185833 and No. 8-226567.

SUMMARY OF THE INVENTION

This type of thermal expansion valve is used to constitute a part of the refrigeration cycle of an air conditioning device on a vehicle, and is either placed inside the engine room with the compressor, the evaporator, the receiver and the like, or inside the passenger room with the evaporator. Therefore, the size of the valve must be reduced as much as possible.

Figure 8:
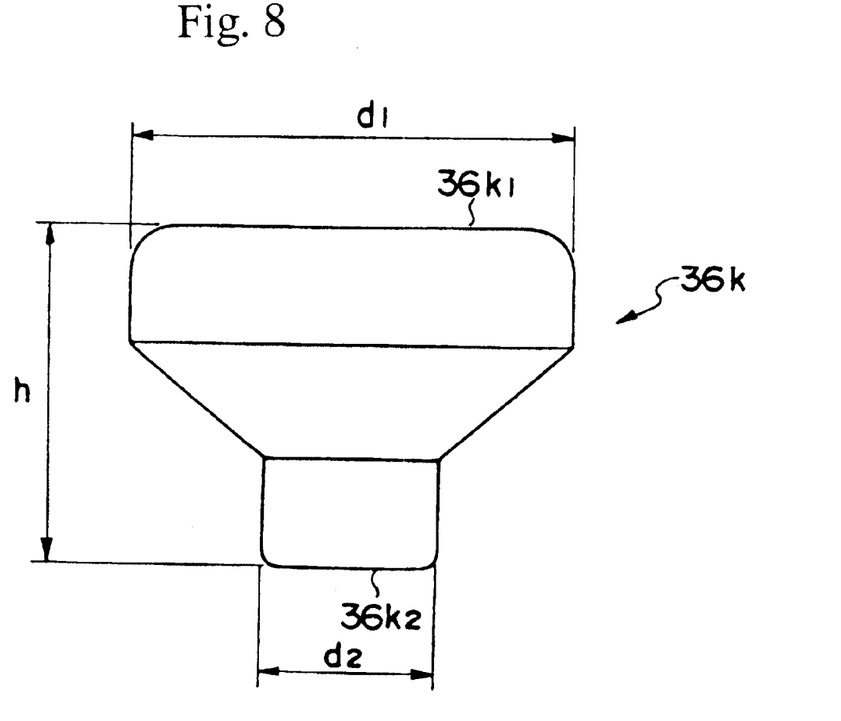
FIG. 8 is a cross-sectional view showing the shape of the plug body used in the conventional thermal expansion valve.
Figure 9:
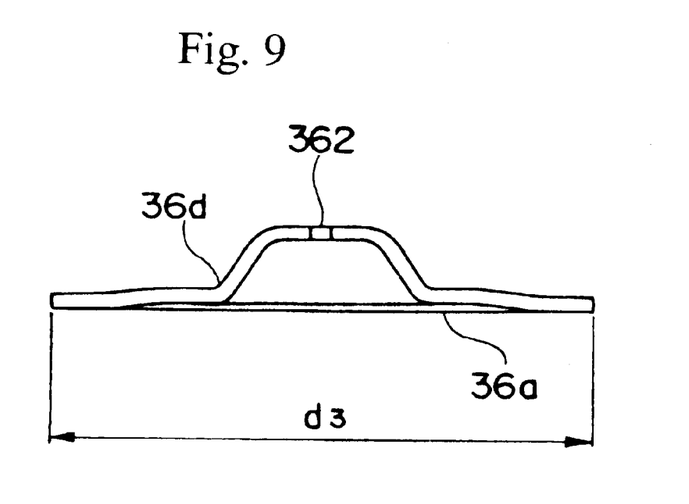
FIG. 9 is a cross-sectional view showing the shape of the diaphragm used in the conventional thermal expansion valve.

However, according to the conventional thermal expansion valve, the size of the power element unit was the problem in trying to miniaturize the thermal expansion valve. That is, as shown in the cross-sectional drawing of FIG. 8, the plug body 36k of the power element unit 36 of the conventional thermal expansion valve is formed so that the diameter $d_1$ at the peak portion $36k_1$ is set in the range of 5.4–5.5 mm, the diameter $d_2$ at the bottom portion $36k_2$ is set in the range of 1.5–1.6 mm, and the height h from the bottom portion $36k_2$ to the peak portion $36k_1$ is set in the range of 4.7–4.8 mm. Moreover, the diameter $d_3$ of the diaphragm 36a of the power element unit 36 is set to 39 mm, as shown in the cross-sectional view of FIG. 9 together with the upper lid 36d. The size of the power element unit was not considered according to the conventional thermal expansion valve.

Therefore, the present invention aims at miniaturizing the plug body included in the power element unit of a thermal expansion valve, and to further provide a miniaturized thermal expansion valve realized by the miniaturization of the plug body. Moreover, t h e present invention realizes, without having to change the structure of the thermal expansion valve, the miniaturization of the plug body leading to the miniaturization of the thermal expansion valve as a whole enabled by the miniaturization of the diaphragm.

In order to achieve the above objects, the present invention provides a thermal expansion valve comprising a valve means that changes the opening of a valve hole and controls the quantity of flow of refrigerant flowing into an evaporator in a refrigeration cycle, and a power element unit equipped with a plug body that seals a predetermined refrigerant in an airtight chamber defined by a diaphragm that controls the movement of the valve means, wherein the diameter $D_1$ of the peak portion of the plug body is within the range of 2 mm$\leq D_1 <$5.4 mm.

According to another feature of the thermal expansion valve of the present invention, the diameter of the diaphragm constituting the power element unit is within the range of 34.5–35.5 mm.

In yet another aspect of the present invention, the thermal expansion valve comprises a valve body including a high-pressure refrigerant passage through which liquid-phase refrigerant to be decompressed travels and a low-pressure refrigerant passage through which gas-phase refrigerant travels, and a valve hole formed to the high-pressure refrigerant passage, a valve means that is driven to move toward or away from the valve hole of the valve body for changing the opening of the valve hole, a power element unit including a diaphragm that drives the valve means and controls the movement thereof, and an airtight chamber defined by the diaphragm, the power element unit mounted to the valve body for detecting the temperature of the refrigerant traveling through the low-pressure refrigerant passage, and a plug body that seals the refrigerant filled into the chamber through a hole formed to the outer wall of the power element unit, wherein the plug body is welded onto the peripheral area of the hole, the diameter $D_1$ of the peak portion of the plug body being within the range of 2 mm$\leq D_1 <$5.4 mm, and the diameter of the diaphragm being within the range of 34.5–35.5 mm.

The thermal expansion valve according to the present invention equipped with a power element unit, including a plug body formed into a specific shape as disclosed above, contributes to reducing the size of the diaphragm and the size of the power element unit, and thereby realizes miniaturization of the thermal expansion valve as a whole.

DETAILED DESCRIPTION OF PREFERRED EMBODIMENTS

The embodiment of the present invention will now be explained with reference to the drawings.

Figure 1:
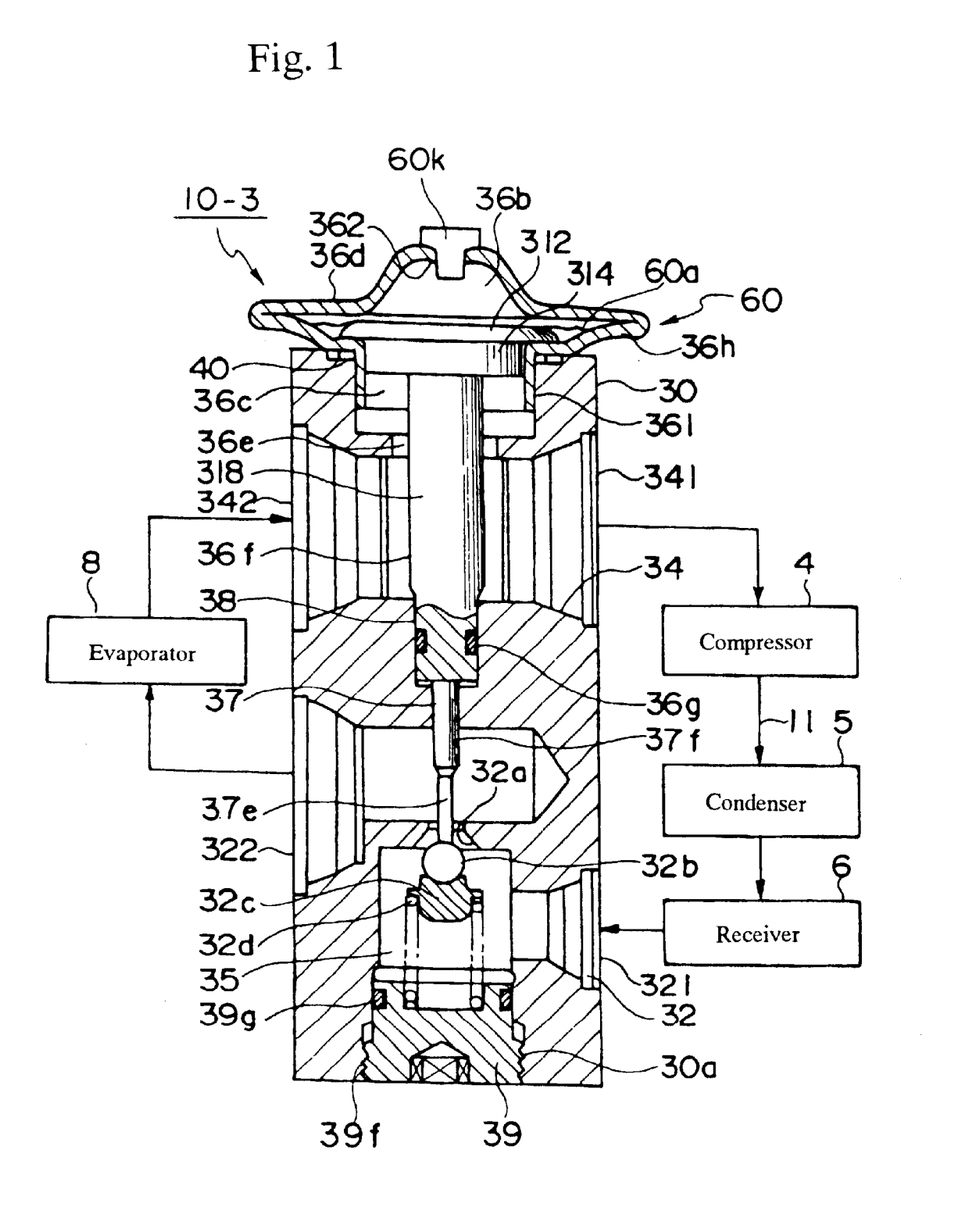
FIG. 1 is a vertical cross-sectional view showing one embodiment of the thermal expansion valve according to the present invention.
Figure 2:
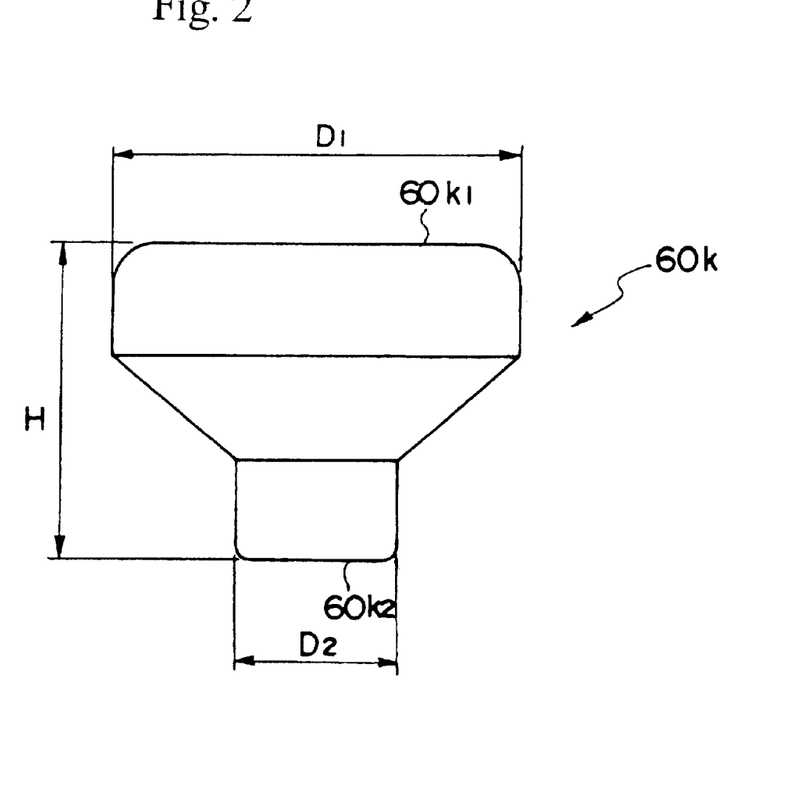
FIG. 2 is a cross-sectional view showing the shape of the plug body used in FIG. 1.

FIG. 1 is a vertical cross-sectional view showing one embodiment of a thermal expansion valve 10-3 according to the present invention. The present valve 10-3 is formed similarly as the thermal expansion valve 10-1 shown in FIG. 5 except that in the present valve, a small-sized plug body 60k is used instead of the plug body 36k constituting the power element unit 36. Moreover, the structure of the present valve 10-3 is identical to the structure of the thermal expansion valve 10-1 of FIG. 5, except that since the present valve utilizes a small-sized plug body 60k, the size of the diaphragm 60a is reduced, and as a result, the power element unit 60 is miniaturized. The plug body 60k is formed for example by forging. Accordingly, in the present explanation of the embodiment of FIG. 1, the same components that act similarly as the components of the thermal expansion valve 10-1 of FIG. 5 are provided with the same reference numbers, and the explanations thereof are omitted. The cross-sectional shape of the plug body 60k of the thermal expansion valve 10-3 is as shown in FIG. 2. In the present embodiment, the diameter $D_1$ of the peak portion 60$k_1$ is in the range of 2 mm$\leq D_1 <$5.4 mm, the diameter $D_2$ of the bottom portion 60$k_2$ is in the range of 0.5 mm$\leq D_2 <$1.5 mm, and the height H from the peak portion 60$k_1$ to the bottom portion 60$k_2$ is in the range of 1.5 mm$\leq$H$<$4.7 mm. According to the best mode for carrying out the embodiment, $D_1$ should be in the range of 2.9 mm$\leq D_1 <$3.1 mm, $D_2$ should be in the range of 1.1 mm$\leq D_2 <$1.3 mm, and $H_2$ should be in the range of 2.2 mm$\leq H_2 <$2.4 mm.

The shape of the plug body 60k of the thermal expansion valve 10-3 according to the present invention is determined in consideration of the miniaturization limit related to the processing of the plug body 60k and the automated plug supply, and the welding strength to be provided when the plug body is welded through projection welding and the like to the hole 362 formed to the upper lid 36d of the power element unit 60. Since the diameter $d_1$ of the peak 36$k_1$ of the plug body 36k shown in FIG. 8 in the thermal expansion valve 10-1 of FIG. 5 is set to 5.4–5.5 mm, and since the diameter $D_1$ of the peak portion $k_1$ of the present plug body 60k is in the range of 2 mm$\leq D_1 <$5.4 mm, the size of the plug body 60k in the power element unit 60 of the present thermal expansion valve 10-3 is reduced. This will enable the size of the power element unit 60 to be reduced, and thus realizes the miniaturization of the thermal expansion valve 10-3 as a whole. Similarly, the diameter $D_2$ of the bottom portion 60$k_2$ of the plug body 60k is in the range of 0.5 mm$\leq D_2 <$1.5 mm, and the height H of the plug body 60k is in the range of 1.5 mm$\leq$H$<$4.7 mm.

Figure 3:
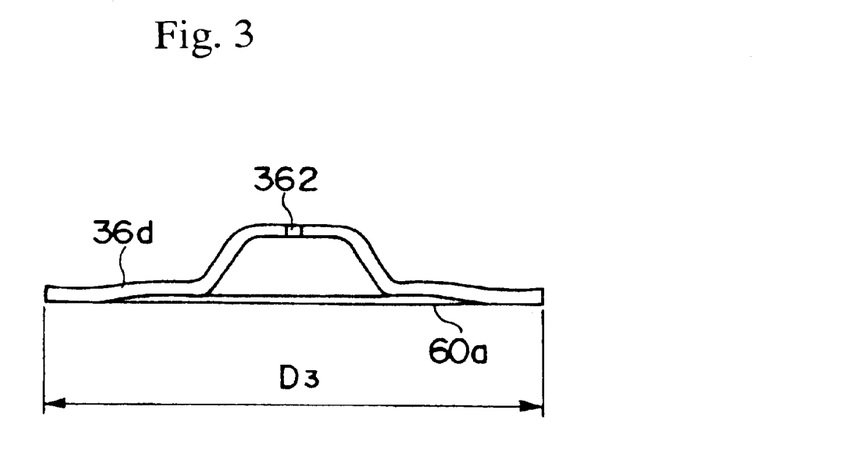
FIG. 3 is a cross-sectional view showing the shape of the diaphragm used in FIG. 1.

Moreover, the diaphragm 60a of the power element unit 60 has a cross-sectional shape as shown with an upper lid 36d in FIG. 3, wherein further to using a small plug body 60k, the diameter $D_3$ of the diaphragm 60a is reduced to the range of 34.5–35.5 mm. Accordingly, the diaphragm of the present embodiment is miniaturized compared to the conventional diaphragm 36a of the power element unit 36 having a diameter $d_3$ of 39 mm.

Figure 4:
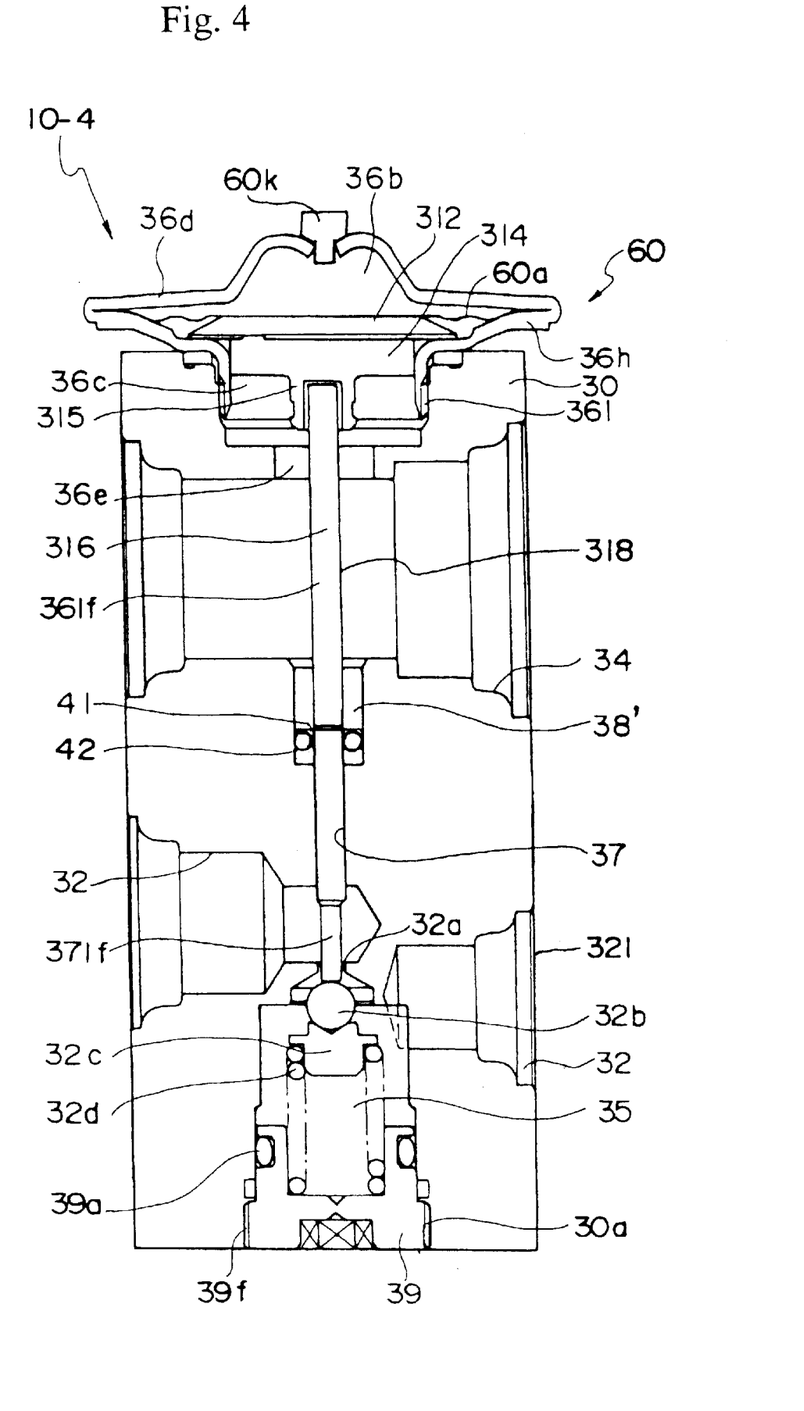
FIG. 4 is a vertical cross-sectional view showing another embodiment of the thermal expansion valve according to the present invention.

FIG. 4 is a vertical cross-sectional view showing another embodiment of the thermal expansion valve 10-4 of the present invention. The present valve 10-4 is similar to the thermal expansion valve 10-2 shown in FIG. 7, except that a small-sized plug body 60k is utilized instead of the plug body 36k constituting the power element unit 36. The only structural difference of the present valve 10-4 compared to the structure of the valve 10-2 of FIG. 7 is that the diaphragm 60a is miniaturized, and as a result, the power element unit 60 as a whole is miniaturized by the use of the small plug body 60k. Accordingly, in the present explanation of the embodiment of FIG. 4, the components that are equivalent to and act similarly as the components in the thermal expansion valve 10-2 of FIG. 7 are provided with the same reference numbers, and the explanations thereof are omitted. Moreover, the small-sized plug body 60k and the diaphragm 60a utilized in the embodiment of FIG. 4 are the same as those shown in FIG. 2 and FIG. 3.

The embodiments of the thermal expansion valve according to the present invention are shown in FIG. 1 and FIG. 4. However, the present invention is not limited to the two embodiments shown above, but can also be applied to a thermal expansion valve where the valve body is driven by a power element unit that includes a diaphragm defining an airtight chamber filled with a predetermined refrigerant and sealed using a plug body.

The thermal expansion valve according to the present invention can be miniaturized as a whole by the use of a plug body having a specific form. Moreover, the miniaturization of the diaphragm leads to the miniaturization of the power element unit, and the present invention contributes to realizing a thermal expansion valve having a reduced size, by providing a miniaturized power element unit without changing the other conventional structural members.

We claim:

1. A thermal expansion valve comprising:
   a valve means that changes the opening of a valve hole and controls the quantity of flow of refrigerant flowing into an evaporator in a refrigeration cycle; and
   a power element unit equipped with a plug body that seals a predetermined refrigerant in an airtight chamber defined by a diaphragm that controls the movement of said valve means;
   wherein the diameter $D_1$ of the a portion of said plug body ranges between 2 mm$\leq D_1 <$5.4 mm.

2. A thermal expansion valve according to claim 1, wherein the diameter of said diaphragm ranged from 34.5 to 35.5 mm.

3. A thermal expansion valve comprising:
   a valve body including a high-pressure refrigerant passage through which liquid-phase refrigerant to be decompressed travels and a low-pressure refrigerant passage through which gas-phase refrigerant travels, and a valve hole formed to said high-pressure refrigerant passage;
   a valve means that is driven to move toward or away from said valve hole of said valve body for changing the opening of said valve hole;
   a power element unit including a diaphragm that drives said valve means and controls the movement thereof, and an airtight chamber defined by said diaphragm, said power element unit mounted to said valve body for detecting the temperature of said refrigerant traveling through said low-pressure refrigerant passage; and
   a plug body that seals the refrigerant filled into said chamber through a hole formed to the outer wall of said power element unit;
   wherein said plug body is welded onto the peripheral area of said hole, the diameter $D_1$ of the a portion of said plug body ranging between 2 mm$\leq D_1 <$5.4 mm, and the diameter of said diaphragm ranging from 34.5 to 35.5 mm.

4. A thermal expansion valve according to claim 1, the diameter D1 of the peak portion of said plug body ranges between 2.9$\leq D_1 <$3.1 mm.

* * * * *